(12) United States Patent
Chin

(10) Patent No.: US 7,304,294 B2
(45) Date of Patent: Dec. 4, 2007

(54) REFLECTIVE ENCODER WITH REDUCED BACKGROUND NOISE

(75) Inventor: Yee Loong Chin, Taman Pinji Mewah (MY)

(73) Assignee: Avago Technologis General IP (Singapore) Pte Ltd, Singapore (SG)

( * ) Notice: Subject to any disclaimer, the term of this patent is extended or adjusted under 35 U.S.C. 154(b) by 42 days.

(21) Appl. No.: 11/352,193

(22) Filed: Feb. 9, 2006

(65) Prior Publication Data
US 2007/0181790 A1    Aug. 9, 2007

(51) Int. Cl.
  *G01D 5/34* (2006.01)
  *G02F 1/01* (2006.01)
  *H01J 40/14* (2006.01)

(52) U.S. Cl. .................. 250/231.13; 250/231.14; 250/231.18; 250/225; 33/1 PT; 341/11

(58) Field of Classification Search ............ 250/231.13, 250/231.14, 231.18, 225; 33/1 PT; 341/11, 341/13; 356/614–618
See application file for complete search history.

(56) References Cited

U.S. PATENT DOCUMENTS 5,498,870 A * 3/1996 Ishizuka .................. 250/237 G
6,437,318 B1 * 8/2002 Egloff et al. ................ 250/225
7,182,258 B2 * 2/2007 Foo et al. .................... 235/454
2006/0255252 A1 * 11/2006 Yamamoto et al. .... 250/231.13

* cited by examiner

*Primary Examiner*—Patrick J. Lee

(57) ABSTRACT

An encoder having a code scale and an emitter detector module is disclosed. The code scale includes alternating reflective and opaque stripes. The emitter-detector module includes a light source that generates light and directs a portion of the generated light to the imaging element and a photodetector that generates a signal representing an intensity of light having a linear polarization in a predetermined direction received by the photodetector, the light source and the photodetector are encapsulated in a transparent medium, wherein there is a gap between the transparent medium and the code scale. The predetermined direction is chosen to reduce the intensity of light received by the photodetector that is reflected from an interface between the transparent medium and the gap. A polarization filter can also be included in the light source to further improve the rejection of the light reflected from the interface of the transparent medium and the gap.

8 Claims, 4 Drawing Sheets

REFLECTIVE ENCODER WITH REDUCED BACKGROUND NOISE

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

Optical encoders utilize a light source and a photodetector to measure changes in the position of an encoding disk or strip. In a transmissive encoder, the encoding disk includes a series of alternating opaque and transparent strips. The light source is located on one side of the code strip, and the photodetector is located on the other side of the code strip. The light source and photodetector are fixed relative to one another, and the code strip moves between the photodetector and the light source such that the opaque regions of the code strip interrupt the light reaching the photodetector. The position of the code strip is determined by measuring the transitions between the light and dark regions observed by the photodiode.

In a reflective encoder, the light source and photodetector are located on the same side of the encoding strip, and the encoding strip consists of alternating reflective and absorbing stripes. The light source is positioned such that light from the light source is imaged into the detector when the light is reflected from the reflective strips.

Transmissive encoders have a number of advantages over reflective encoders in terms of tolerance and contrast ratios. In a reflective encoder, the distance between the code strip and the detector is critical as either the code strip itself or the light source as seen in the reflected light from the code strip is imaged into the detector. Hence, if there is an error in the code strip to detector distance, the image will be out of focus and errors will result.

In a transmissive encoder, the light from the light source is colliminated before it reaches the code strip, and hence, the light leaving the code strip is also colliminated. The detection assembly needs only to image this colliminated light onto the detector surface. Hence, the only critical distance is the distance from the imaging lens to the detector, which can be tightly controlled by the detector manufacturer independent of the specific encoder assembly.

Unfortunately, transmissive recorders require that two separate components, the light source and photodetector, be mounted and aligned with one another at the time of assembly of the encoder. Reflective encoders, in contrast, are constructed from a single emitter-detector element that is packaged together with the various optical components for imaging the light source onto the photodetector. This reduces the cost of assembly. In addition, there is a trend toward smaller and smaller mechanical systems. As the size of the mechanical systems in which the encoders are used is reduced, the problems associated with mounting components on both sides of the code strip become more severe. In such systems, reflective encoders have significant advantages in spite of the problems discussed above.

Reflective encoders, however, have significantly worse signal-to-noise ratios due to the internal reflection of the light source within the source-detector module. In a reflective encoder, the light source and detector are encapsulated together in a transparent material that also provides the lens functions needed to illuminate the code wheel in the desired manner and to image the light onto the detector. Part of the light generated by the light source is reflected at the encapsulation-air boundary back toward the detector. This light forms a background that is independent of the code wheel, and hence, lowers the signal-to-noise ratio of the encoder.

SUMMARY OF THE INVENTION

The present invention includes an encoder having a code strip and an emitter detector module. The code strip includes alternating reflective and opaque stripes. The emitter-detector module includes a light source that generates light and directs a portion of the generated light to the imaging element and a photodetector that generates a signal representing an intensity of light received by the photodetector having a linear polarization in a predetermined direction. The light source and the photodetector are encapsulated in a transparent medium, wherein there is a gap between the transparent medium and the code strip. The predetermined direction is chosen to reduce the intensity of light received by the photodetector that is reflected from an interface between the transparent medium and the gap. A polarization filter can also be included in the light source to further improve the rejection of the light reflected from the interface of the transparent medium and the gap.

DETAILED DESCRIPTION OF THE PREFERRED EMBODIMENTS OF THE INVENTION

Figure 3:
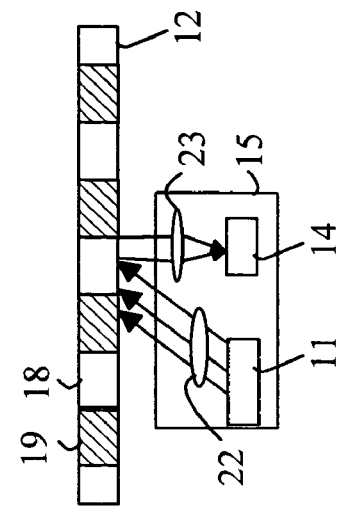
FIG. 3 illustrates another form of imaging encoder.
Figure 2:
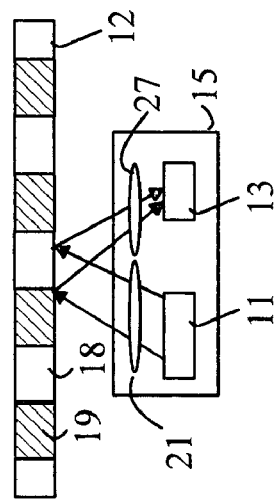
FIG. 2 illustrates one type of reflective encoder.
Figure 1:
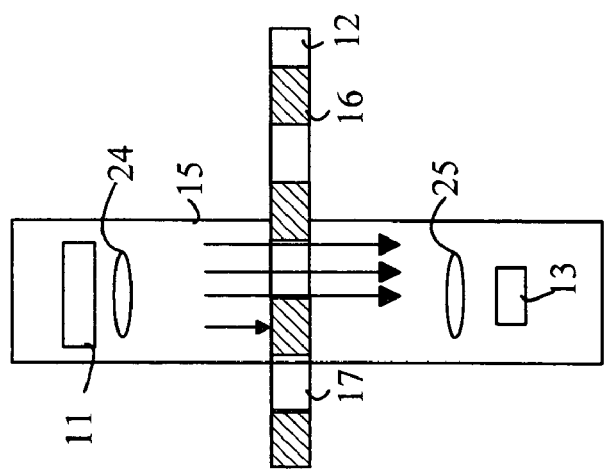
FIG. 1 illustrates a transmissive encoder.

Refer now to FIGS. 1-3, which illustrate some typical encoder designs. The encoder can be divided into an emitter/detector module 15 and a code wheel or code strip. To simplify the terminology used herein, the term "code scale" is defined to include both linear code strips and circular code disks or code wheels. Module 15 includes an emitter 11 that illuminates a portion of the code scale 12. A detector 13 views the illuminated code scale. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as lens 24. Code scale 12 includes opaque stripes 16 and transparent stripes 17. When code scale 12 moves between emitter 11 and detector 13, the light beam is interrupted by the opaque stripes on the code scale. The photodiodes in the detector receive flashes of light. The resultant signal is then used to generate a logic signal that transitions between logical one and logical zero.

The detector can include an imaging lens 25 that images the collimated light onto the photodiode. Lens 25 can be used to adjust the size of the light stripes to match the size of the photodiode or photodiodes in the detector. When used in this manner, the photodetector is placed at a point between the code scale and the focal point of lens 25. The distance between the photodetector and the lens determines the size of the code scale image on the photodetector.

In general, a transmissive encoder is constructed from two separate sub-modules that are provided to the manufacturer of the encoder. The first sub-module includes the light source consisting of emitter 11 and lens 24. The second sub-module consists of photodetector 13 and lens 25. Since the light is collimated, the only critical distances are those between emitter 11 and lens 24 and between lens 25 and photodetector 13. The sub-module manufacturer can control these distances to a high level of precision. Hence, the tolerances that need to be maintained by the encoder manufacturer are substantially reduced in transmissive designs. However, transmissive encoders are more expensive from the point of view of the entity assembling the encoder, since two sub-modules must be mounted and aligned. In addition, as noted above, in many applications there is insufficient space to accommodate the light source on the opposite side of the encoder from the photodetector, and hence, a reflective encoder is required.

FIG. 2 illustrates one type of reflective encoder. In reflective encoders, the code scale includes reflective stripes 18 and absorptive stripes 19. The emitter includes an optical system such as a lens 21 that images the emitter light source into the detector when the light strikes a reflective stripe on the code scale. The light from the emitter is reflected or absorbed by the stripes on the code scale. The output from the photodetector is again converted to a logic signal. In embodiments in which the photodetector includes a plurality of photodiodes that provide a signal that depends on matching an image of the stripes to the photodiodes, a second lens 27 can be included to adjust the size of the code scale image to the size of the photodetectors in a manner analogous to that described above.

FIG. 3 illustrates another form of imaging encoder. An imaging encoder operates essentially the same as the reflective encoder described above, except that module 15 includes imaging optics 23 that form an image of the illuminated code scale on the detector 14. In addition, the light source is processed by lens 22 such that the code scale is uniformly illuminated in the region imaged onto the detector.

To simplify the following discussion, the various lenses used to image the light source into the photodetector will be omitted from the remaining figures. However, it is to be understood that the light source and/or the photodetector may include lenses or other optical elements.

Figure 4:
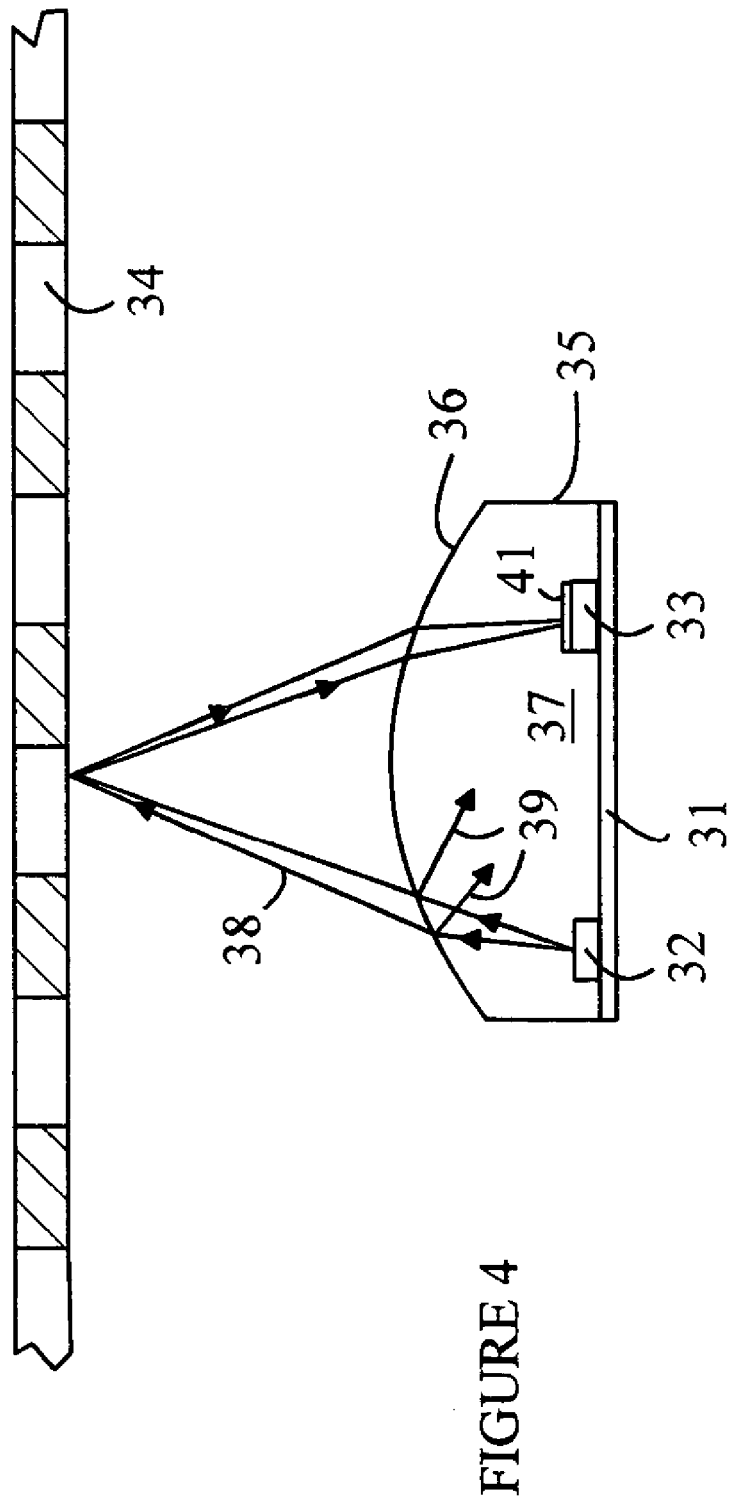
FIG. 4 illustrates a typical reflective encoder layout according to one embodiment of the present invention.

Refer now to FIG. 4, which illustrates a typical reflective encoder layout according to one embodiment of the present invention. The code scale 34 is illuminated with light from emitter-detector module 37 that includes an LED 32 and a photodetector 33 that are mounted on a substrate 31. Photodetector 33 includes one or more photodiodes. The number of photodiodes depends on the particular encoder design. These components are encapsulated in a clear epoxy layer 35 having a top surface that is molded to provide a lens that images the light from LED 32 that is reflected from code scale 34 onto photodetector 33. A ray of the imaged light source is shown at 38.

The clear epoxy encapsulant has an index of refraction that is greater than that of the surrounding air. As a result, part of the light striking surface 36 is reflected back into the emitter-detector module as shown at 39 due to the Fresnell reflection. Some of this light strikes photodetector 33 directly. Some of the reflected light bounces off of the walls of the emitter-detector module and also reaches photodetector 33. The amount of light reaching photodetector 33 in this manner is independent of the light reflected from code scale 34, and hence, forms a constant background illumination that reduces the signal-to-noise ratio of photodetector 33.

The significance of this background light depends on the size and resolution of the encoder. The amount of light that is reflected from code scale 34 depends on the size of the reflective stripes on the code scale. In very high-resolution encoders, these stripes are small, and hence, the amount of reflected light is also small. Similarly, many applications require physically small encoders due to space constraints. Here again, the size of the reflective stripes is small. When the reflected light from the code scale at the photodiode has an intensity that is similar to that of the background light from the internal reflections at surface 36, the encoder will not perform properly.

The present invention is based on the observation that the Fresnell-reflected light from surface 36 is partially polarized. The light emitted by light source 32 can be viewed as consisting of light that has two orthogonal linear polarizations, one into the plane of the drawing and one parallel to the plane of the drawing. The reflection coefficient for light that has an electric field parallel to the plane of incidence goes to zero at the Brewster angle. At other angles, the reflected light is partially polarized. Hence the Fresnell-reflected light that is reflected from surface 36 into photodetector 33 is partially polarized. That is, the light will have two linearly polarized components in which one of the components will be greater than the other. This light can be eliminated by placing a linear polarization filter 41 in front of photodetector 33 with its polarization axis positioned to eliminate light having the polarization component with the maximum amplitude.

The above-described embodiment of the present invention blocks a portion of the Fresnell-reflected light from entering photodetector 33. Alternatively, light source 32 can be replaced with a linearly polarized light source oriented such that the polarization of light that is preferentially reflected at surface 36 is eliminated from the light generated by light source 32. In this case, the amount of Fresnell-reflected light is reduced, thereby improving the signal-to-noise ratio of the encoder. Linearly polarized light sources are known to the art, and hence, will not be discussed in detail here. For the purposes of the present discussion, it is sufficient to note that such a source can be created by placing a polarization filter in front of an LED or other non-polarized light source. It should also be noted that lasers that emit linearly polarized light are also known in the art.

Figure 5:
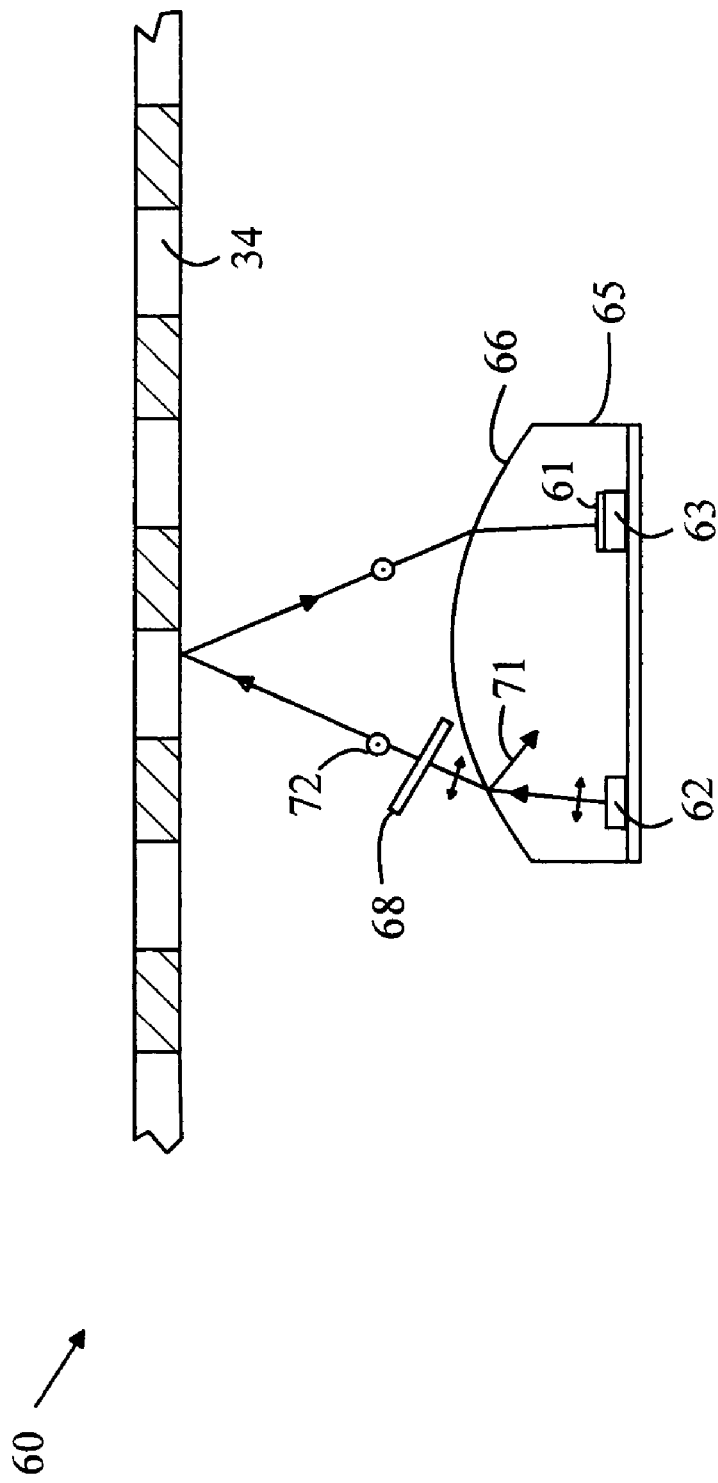
FIG. 5 is a cross-sectional view of an encoder according to another embodiment of the present invention.

Refer now to FIG. 5, which is a cross-sectional view of an encoder according to another embodiment of the present invention. Encoder 60 includes an emitter detector module 65 having a linearly polarized light source 62. Light source 62 provides a polarization that is in the plane of the drawing. The direction of polarization is chosen to reduce the amount of light that will suffer Fresnell reflection at boundary 66. Upon reflection at boundary 66, part of this light is still reflected back into emitter detector module 65, since all the light will not strike boundary 66 at the Brewster angle. The remainder of the light will exit emitter detector module 65 and pass through a polarization rotator such as quarter wave plate 68 that rotates the polarization through 90 degrees as shown at 72. This light is reflected from code scale 34 and imaged onto photodetector 63, which includes a polarization filter 61. Polarization filter 61 is positioned to pass light having a polarization vector that is perpendicular to the plane of the drawing, while blocking light having a polarization vector in the plane of the drawing. Hence, the light shown at 71 that was reflected at boundary 66 is blocked.

Figure 6:
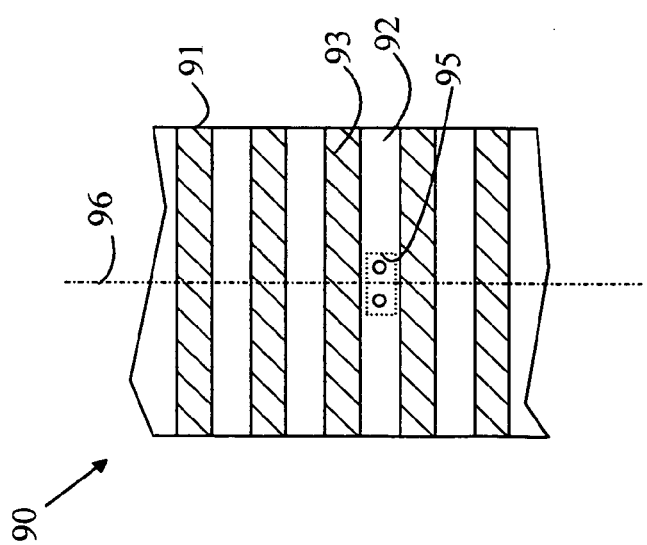
FIG. 6 is a top view of a portion of a linear encoder 90 having a code strip that includes reflective and absorptive stripes arranged along a line.

The above-described embodiments utilize code scales to modulate the light from the emitter detector module. The term code scale is normally used to refer to a linear encoder, i.e., a series of alternating rectangular stripes along a line that are used to measure the linear displacement of one component relative to another. Refer now to FIG. 6, which is a top view of a portion of a linear encoder 90 having a code scale 91 that includes reflective and absorptive stripes 92 and 93, respectively, arranged along a line 96. An emitter detector module 95 is placed under a section of the code scale. The code scale moves with respect to emitter detector module 95 in a direction parallel to line 96.

Figure 7:
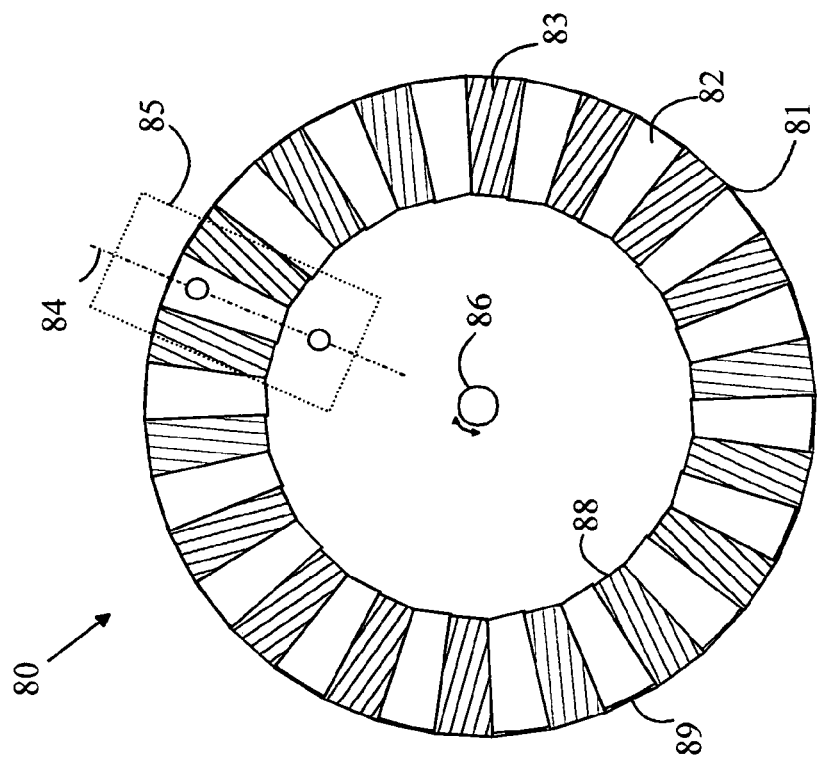
FIG. 7 is a top view of an encoder according to another embodiment of the present invention.

However, it will be appreciated that a shaft encoder that utilizes a code disk to measure the angular displacement of the shaft relative to a fixed position can also be constructed utilizing the teaching of the present invention. Refer now to FIG. 7, which is a top view of an encoder 80 according to another embodiment of the present invention. Encoder 80 encodes the angular position of shaft 86. Encoder 80 is similar to the encoders discussed above in that an emitter detector module 85 illuminates a code pattern and measures the light reflected by the reflective portions of the code pattern. The code scale discussed above is replaced by a code disk 81, which includes alternating truncated pie shaped sectors 82 and 83 along a circle that has a center coincident with that of shaft 86. Each sector is defined by two radii of a circle 89 having its center at the center of shaft 86 and circles 88 and 89. The light source and photodetector of emitter detector module 85 are aligned on a radius 84 of circle 89. To simplify the terminology used herein, the term "code scale" is defined to include both linear code strips and circular code disks.

Various modifications to the present invention will become apparent to those skilled in the art from the foregoing description and accompanying drawings. Accordingly, the present invention is to be limited solely by the scope of the following claims.

What is claimed is:

1. An encoder, comprising:
    a code scale comprising alternating reflective and opaque stripes, and
    an emitter-detector module comprising a light source and a photodetector operably associated with the light source, the light source and photodetector being encapsulated in a transoarent medium defining an interface, the light source being configured to generate light and emit same in a first direction towards the interface and thence therethrough towards the code scale for reflection from the opaque stripes disposed on the code scale in a second direction towards the interface and thence therethrough towards the photodetector, a gap being disposed between the interface and the code scale;
    wherein a polarization filter is positioned operably between the photodetector and the interface, the polarization filter comprising a polarization axis oriented to cause the polarization filter to reduce an intensity of light sensed by the photodetector that is emitted by the light source and reflected internally within the encapsulant from the interface towards the photodetector.

2. The encoder of claim 1, wherein the polarization filter is further configured and oriented to pass light traveling in the second direction that has been reflected from the code scale towards the photodetector.

3. The encoder of claim 1, wherein said light source is polarized and configured and oriented to reduce the intensity of the light reflected internally within the encapsulant from the interface towards the photodetector.

4. The encoder of claim 1, further comprising a polarization rotator disposed between the interface and the code scale.

5. An encoder, comprising:
    a code scale comprising alternating reflective and opaque stripes, and
    an emitter-detector module comprising a light source and a photodetector operably associated with the light source, the light source and photodetector being encapsulated in a transparent medium defining an interface, the light source being configured to generate light and emit same in a first direction towards the interface and thence therethrough towards the code scale for reflection from the opaque stripes disposed on the code scale in a second direction towards the Interface and thence therethrough towards the photodetector, a gap being disposed between the interface and the code scale;
    wherein the light source is polarized and configured and oriented to reduce an intensity of light reflected internally within the encapsulant from the interface towards the photodetector.

6. The encoder of claim 5, further comprising a polarization filter positioned operably between the photodetector and the interface, the polarization filter comprising a polarization axis oriented to reduce an intensity of light emitted by the light source and reflected internally within the encapsulant from the interface towards the photodetector.

7. The encoder of claim 6, wherein the polarization filter is further configured and oriented to pass light traveling in the second direction that has been reflected from the code scale towards the photodetector.

8. The encoder of claim 5, further comprising a polarization rotator disposed between the interface and the code scale.

* * * * *

UNITED STATES PATENT AND TRADEMARK OFFICE
CERTIFICATE OF CORRECTION

PATENT NO. : 7,304,294 B2  Page 1 of 1
APPLICATION NO. : 11/352193
DATED : December 4, 2007
INVENTOR(S) : Yee Loong Chin It is certified that error appears in the above-identified patent and that said Letters Patent is hereby corrected as shown below:

On the Title page Item (73), (Assignee), Line 1, delete "Technologis" and insert -- Technologies --;

Column 5, Line 53, Claim 1, delete "transoarent" and insert -- transparent --;

Column 6, Line 35, (Approx.), Claim 5, delete "Interface" and insert -- interface --.

Signed and Sealed this

Second Day of November, 2010

David J. Kappos
*Director of the United States Patent and Trademark Office*